Figure 1:
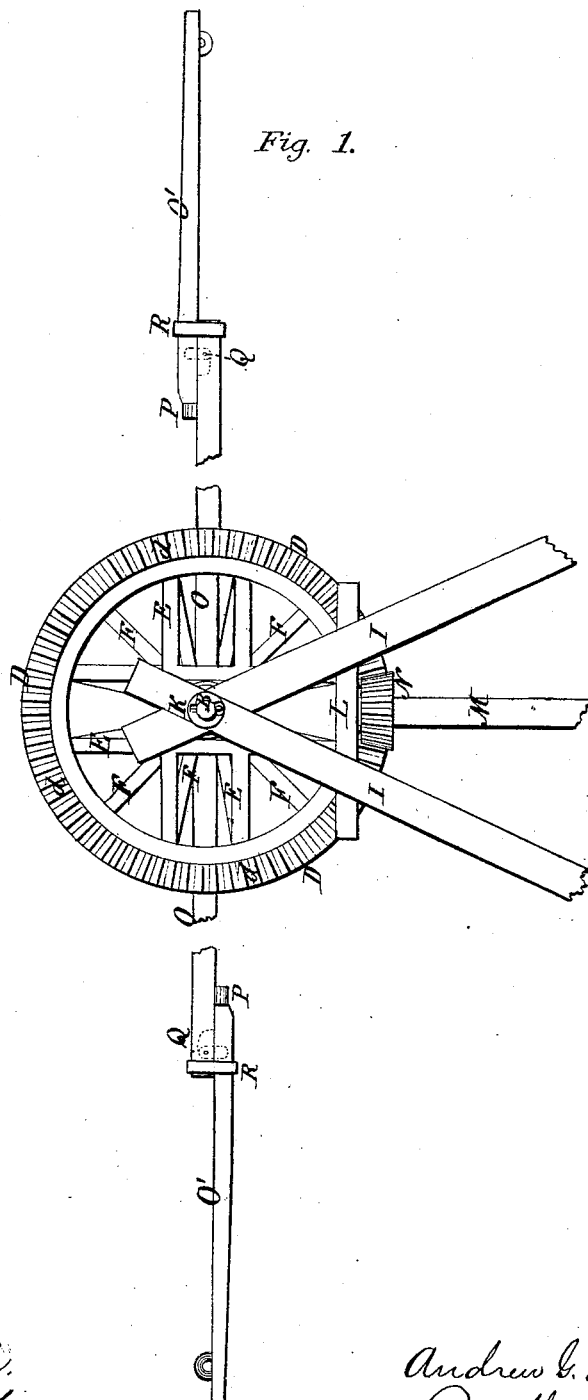

UNITED STATES PATENT OFFICE.

CHARLES NATHANIEL GOSS, OF CLAREMONT, NEW HAMPSHIRE.

IMPROVEMENT IN HORSE HAY-RAKES.

Specification forming part of Letters Patent No. 135,330, dated January 28, 1873.

*To all whom it may concern:*

Be it known that I, CHARLES NATHANIEL GOSS, of Claremont, in the county of Sullivan and State of New Hampshire, have invented certain Improvements in Horse Hay-Rakes; and I do hereby declare that the following, taken in connection with the drawing which accompanies and forms part of this specification, is a description of my invention sufficient to enable those skilled in the art to practice it.

My invention relates to certain details of construction, hereinafter particularly set forth.

In the drawing, Figure 1 is a perspective view of a horse-rake embodying my invention, a portion of one of the wheels being broken away. Fig. 2 is a fragmentary vertical section, showing the position of the teeth when in the act of raking. Fig. 3 is an under-side view of one of the tooth-heads. Fig. 4 is an under-side view of the stub-axle and its plate; and Fig. 5 is a vertical central section of the stub-axle plate, axle, and wheels.

A is the frame, provided with shafts 1, as usual. The rod B, upon which the teeth-heads C are centered or hung, is located, as seen, at some distance forward of a line passing through the axles of the wheels, and the tips 2 of the teeth D, when the rake is in operation, all range a little forward of a vertical plane passing through the axis of the wheels; and these tips, as shown, are so bent as, when in use, to turn very slightly upward from their lowest point of curvature, but so that, while the convex curvature rests near the tip upon the ground, the teeth shall not fail to pick up and gather the hay.

The tip thus never drags or scratches, and the tooth may be said to slide upon the ground like a sled or skate runner. As teeth are usually shaped and hung, their tips being much to the rear of the axis of the wheels, upon ascending rising ground the points of the teeth swing forward and fail to pick up the hay, and upon a descending grade the points fall back and the teeth lose the hay which they may have dragged along, and in either case the rake does not perform its duty.

When the fulcrum or center of motion of the teeth is at the rear of the axle these difficulties are still greater; but by placing the fulcrum forward of the axles, and also bringing the earth-touching part of the teeth directly beneath a line passing through the wheel-axles, then, whether in ascending or descending, the teeth always touch the ground at the proper point and never fail to gather the hay, the points of bearing of the teeth upon the ground being about in line with the points of bearing of wheels upon the ground.

The tooth-heads C are made in a single piece, comprising a sleeve, 3, (by which they are hung upon the fulcrum-rod B) and the part 4, which is formed with a bolt-hole, 5, and two converging flanges, 6 6, on their under side. The tooth is attached at its upper end by a single bolt passing through the broader part of the space between the flanges, and the narrower space between the flanges receives and steadily supports on three sides the tooth at a point beyond the bolt. The simplicity of this construction and the facility with which a tooth can be put on, held, or removed is apparent.

The heads are made sufficiently heavy to keep the teeth down all that they require, in view of their construction, location, and action, no springs of any sort being employed or necessary, nor any effort of the driver for such purpose. This head also, being rigid, gives and maintains, for a given length of tooth, a better relative position of the tip of the tooth with regard to the earth; and, moreover, it cannot yield as the tooth itself would if it reached to and were itself fulcrumed upon the bar B.

E is a lifting-bar for lifting the teeth to discharge the hay. Upon it, located about centrally, is a yoke or staple, 7, provided with a friction-roller. Through the eye of this yoke passes the free end of a lifting-lever, F, which is fulcrumed at 9, the forward end being in a convenient position to be acted upon by the foot of the driver. As the forward end is depressed the rear end, as it lifts the bar E and the teeth, rides under the roller and passes through the yoke, the construction being simple and efficient, and the power required being but little. G is the stub-axle plate, formed with a short cylindrical axle, 10, projecting therefrom, but made integral with it. This axle, in order to give it greater strength at the points of greatest strain and leverage, is made of larger diameter for a short distance from the plate, as seen at 11, the remainder of its length being still cylindrical, but of a some- 2 Sheets--Sheet 1.

A. G. HAGERSTROM.
Horse-Powers.

No. 135,331. Patented Jan. 28, 1873.

Witnesses,
C. H. Poole.
John R. Young.

Inventor
Andrew G. Hagerstrom, by
Prindle and Co., his Attys.